(12) United States Patent
Sukenari et al.

(10) Patent No.: US 7,336,295 B2
(45) Date of Patent: Feb. 26, 2008

(54) VIDEO MAGNIFIER

(75) Inventors: Kazuhiro Sukenari, Nagoya (JP); Eiji Togawa, Nagoya (JP); Tetsuro Kato, Nagoya (JP); Shuntaro Hayashi, Chita (JP)

(73) Assignee: Elmo Co., Ltd., Aichi (JP)

( * ) Notice: Subject to any disclaimer, the term of this patent is extended or adjusted under 35 U.S.C. 154(b) by 915 days.

(21) Appl. No.: 10/758,166

(22) Filed: Jan. 15, 2004

(65) Prior Publication Data

US 2004/0246340 A1  Dec. 9, 2004

(30) Foreign Application Priority Data

Jun. 6, 2003 (JP) .............................. 2003-162300

(51) Int. Cl.
*H04N 7/18* (2006.01)
(52) U.S. Cl. .......................................... 348/63; 348/61
(58) Field of Classification Search .................. 348/61, 348/63
See application file for complete search history.

(56) References Cited

U.S. PATENT DOCUMENTS 5,633,674 A * 5/1997 Trulaske et al. .............. 348/63

FOREIGN PATENT DOCUMENTS

JP          5-78077       10/1993

* cited by examiner

*Primary Examiner*—Allen Wong
(74) *Attorney, Agent, or Firm*—William L. Androlia; H. Henry Koda

(57) ABSTRACT

A video magnifier includes a monitor having a rectangular display screen, a base having a top on which the monitor is mounted, the base further having a right side, a left side, a front and a rear, a plurality of mounting sections formed on the right and left sides and at least one of the front and the rear of the base respectively, a camera holder detachably attached to one of the mounting sections, an imaging camera held on the holder so as to be detachable from the holder and having supporting legs supporting the camera within the camera holder at a predetermined height from a face to be imaged, and an image display control circuit for controlling the monitor so that an image imaged by the imaging camera is displayed on the display screen of the monitor.

18 Claims, 7 Drawing Sheets

VIDEO MAGNIFIER

BACKGROUND OF THE INVENTION

1. Field of the Invention

This invention relates to a video magnifier having an improved easiness in operation.

2. Description of the Related Art

JP-U-5-78077 proposes a portable video magnifier including a display unit with a turning mechanism. The proposed video magnifier comprises a video camera, a rectangular display monitor and a monitor holder for holding the display monitor. The turning mechanism includes a combination of a generally H-shaped notch groove formed in the monitor holder and a pair of pins provided on the display monitor.

However, the pins need to be moved in the notch groove in order that the display monitor may be changed between a longitudinally longwise state and a laterally longwise state. Thus, the above-noted video magnifier is disadvantageous in easiness in the operation. Furthermore, the user needs to turn his or her eyes to a large extent between when the video camera is moved to scan a character string or sentence and when a sentence displayed on the display monitor is read. The above video magnifier is disadvantageous particularly for the weak-sighted and the aged. Additionally, the same drawback as described above arises also when predetermined blanks in a document are filled on the display.

SUMMARY OF THE INVENTION

Therefore, an object of the present invention is to provide a video magnifier which has an improved easiness in changing the display monitor between the longitudinally longwise state and the laterally longwise state and in filling the document on display.

To achieve the object, the present invention provides a video magnifier comprising a monitor having a rectangular display screen, a base having a top on which the monitor is mounted, the base further having a right side, a left side, a front and a rear, a plurality of mounting sections provided on the right and left sides and at least one of the front and the rear of the base, a camera holder detachably attached to one of the mounting sections, an imaging camera held on the holder so as to be detachable from the holder and having a supporting leg supporting the camera within the camera holder at a predetermined height from a face to be imaged, and an image display control circuit provided in the base for controlling the monitor so that an image imaged by the imaging camera is displayed on the display screen of the monitor.

The camera holder holding the imaging camera is attached to one of the mounting sections provided on the right and left sides for a laterally written sentence. At this time, the imaging camera held is supported by support legs so as to be located at a predetermined height from a face to be imaged. The base is moved left and right so that the laterally written document is scanned, whereby an enlarged character displayed on the display screen of the monitor is read. Since the monitor and the imaging camera are moved together with the base, the operator's eyes can be concentrated onto the display screen of the monitor. Consequently, the easiness in operating the video magnifier can be improved.

When characters or the like are written into a laterally written document, a distal end of a writing implement such as a pen is inserted through a space between the support legs and the characters or the like can be written into the document while the operator is viewing the display screen of the monitor. When the operator is right-handed, the camera holder is attached to the right mounting section and the imaging camera is then held on the camera holder. On the other hand, when the operator is left-handed, the camera holder is attached to the left mounting section and the imaging camera is then held on the camera holder. Consequently, the easiness in the entry into the document can be improved.

When the document is vertically written, the base is turned 90 degrees rightward or leftward so that the monitor is switched to a longitudinally longwise position. Then, the holder holding the imaging camera is attached to either leftward or rightward directed mounting section. The imaging camera thus held is supported by the support legs so as to be located at a predetermined height from the face to be imaged. The base is moved forward and rearward so that the vertically written sentences are scanned, and the characters on the display screen of the monitor are read. In this case, too, the operator's eyes can be concentrated onto the display screen of the monitor since the monitor and the imaging camera are moved together with the base. Consequently, the easiness in operating the video magnifier can be improved.

When characters or the like are written into a laterally written document, the distal end of a writing implement is inserted through a space between the support legs and the characters or the like can be written into the document while the operator is viewing the display screen of the monitor. When the operator is right-handed, the base is caused to pivot so that the imaging camera is located on the right of the operator when the operator is right-handed and so that the imaging camera is located on the left of the operator when the operator is left-handed. Consequently, the easiness in the entry into the vertically written document can be improved.

In one preferred form, the mounting section includes a generally T-shaped mounting groove and the camera holder includes a cylindrical holding section and a generally T-shaped mounting arm protruding perpendicularly from an outer periphery of the holding section. The mounting arm is detachably fitted into the mounting groove in a relation of male and female engagement, whereby the camera holder is detachably attached to the mounting section. Consequently, the camera holder can easily be attached to and detached from each mounting section.

In another preferred form, the imaging camera includes a cylindrical casing for accommodating the camera and a ring fitted with an outer circumference of the casing and having four flat faces, and the cylindrical holding section of the camera holder has an inner circumferential wall formed with four flat wall faces. The flat wall faces and the flat faces are engaged with each other respectively when the imaging camera is inserted into the cylindrical holding section to be held, whereby the imaging camera is prevented from turning and is positioned. When the imaging camera is inserted into the cylindrical casing to be held, the four flat faces formed on the ring fitted with the outer periphery of the casing are engaged with the four flat wall faces respectively. Thus, the imaging camera can be positioned easily and yet reliably.

In further another preferred form, the video magnifier further comprises a tilting mechanism provided on the top of the base so that the monitor is inclined forward, rearward, left and right. When the front side of the monitor is inclined lower, the visibility of the display screen can be improved.

In further another preferred form, the tilting mechanism includes a first tilting shaft pivotally mounted on a pair of shaft support brackets and a second tilting shaft rotatably inserted through a support shaft fixed to the first tilting shaft so as to be perpendicular to the first tilting shaft. Consequently, the construction of the tilting mechanism can be compacted.

In further another preferred form, the video magnifier further comprises a roller provided on the bottom of the base so as to be moved either left and right or forward and rearward. Consequently, the base can be moved smoothly both forward and rearward and left and right and prevented from the movement in the oblique directions. Furthermore, the base is turned 90 degrees leftward or rightward when the video magnifier is switched between the case where a laterally written sentence is read and the case where a vertically written sentence is read. Accordingly, the roller is provided so as to be moved either left and right or forward and rearward. Consequently, both laterally and vertically written sentences can be scanned reliably.

BRIEF DESCRIPTION OF THE DRAWINGS

Other objects, features and advantages of the present invention will become clear upon reviewing the following detailed description of the invention with reference to the accompanying drawings, in which.

DETAILED DESCRIPTION OF THE INVENTION

Figure 1:
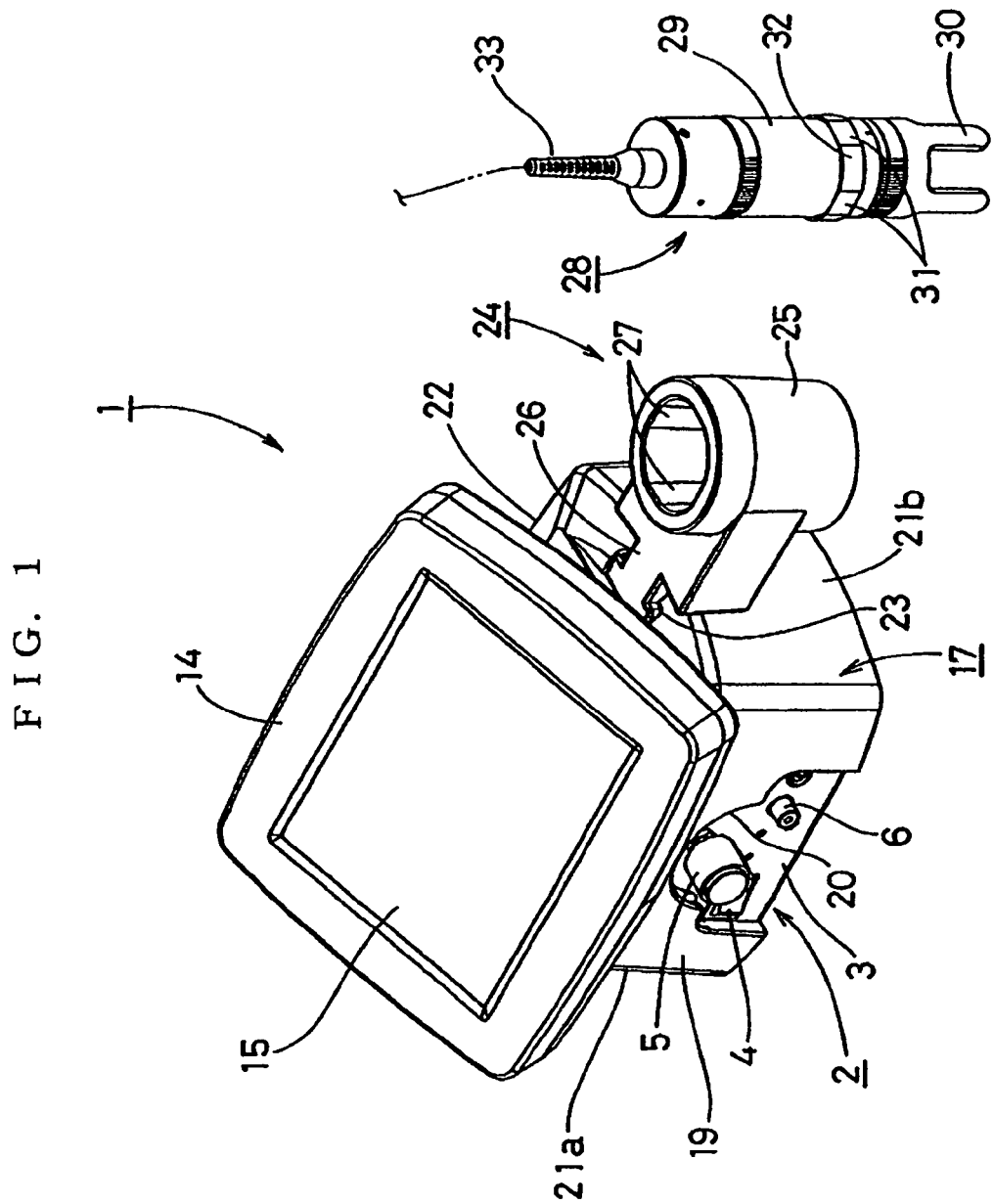
FIG. 1 is a perspective view of the video magnifier of one embodiment in accordance with the present invention.
Figure 2:
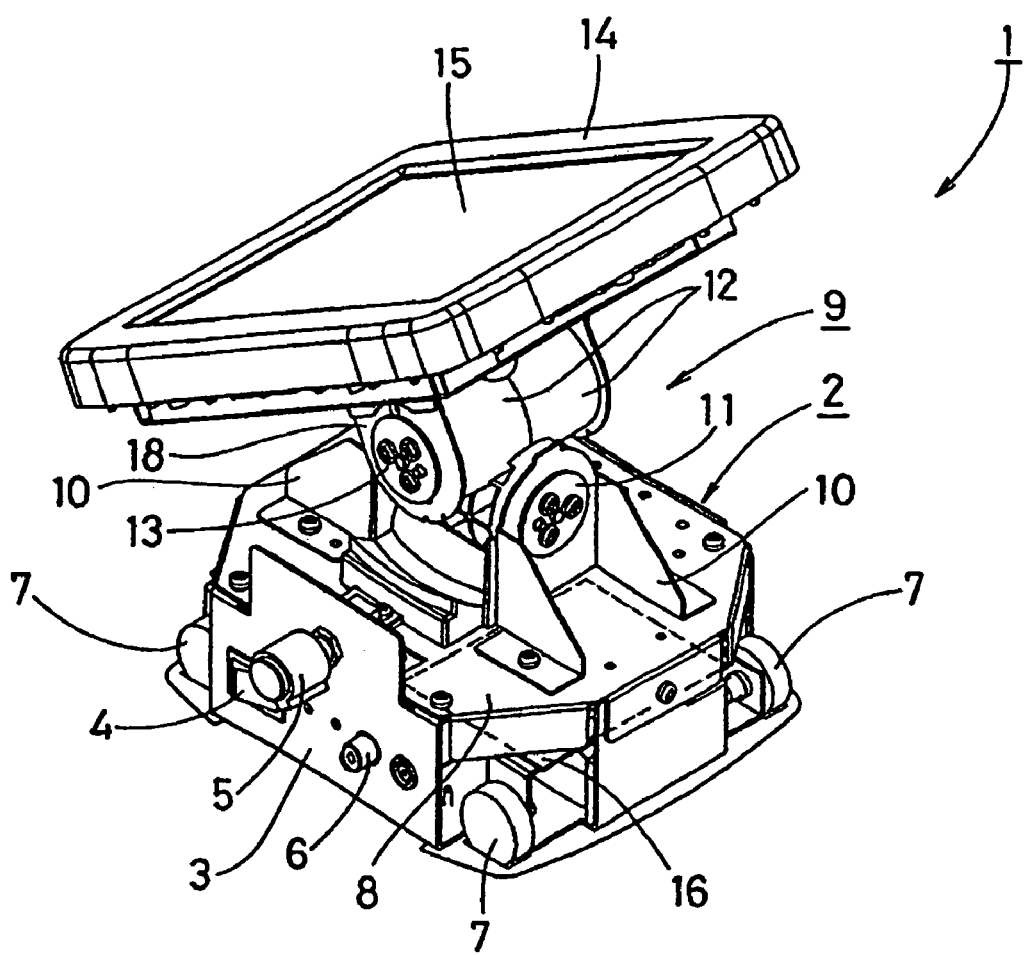
FIG. 2 is a perspective view of the video magnifier with a base cover being eliminated.

One embodiment of the present invention will be described with reference to the accompanying drawings. Referring to FIG. 1, the video magnifier 1 of the embodiment is shown. The video magnifier 1 comprises a base 2, an LCD monitor 14, a camera holder 24 and an imaging camera 28. The base 2 includes a front side 3 which serves as a front of the apparatus when the LCD monitor 14 is in the laterally long position. The front side 3 includes a switch 4, an adjusting knob 5, a connection terminal 6 and the like. Four rollers 7 are fixed at four corners of a bottom of the base 2 respectively, as shown in FIG. 2. Cords connecting the base 2 and an imaging camera 28 with each other are eliminated.

A tilting mechanism 9 is provided on a top 8 of the base 2 for inclining the LCD monitor 14 right and left and forward and rearward. The tilting mechanism 9 includes a first tilting shaft 11 pivotally mounted on a pair of shaft support brackets 10 and 11 and a second tilting shaft 13 rotatably inserted through a support shaft 12 fixed to the first tilting shaft 11 so as to be perpendicular to the first tilting shaft. A circuit board 16 on which an image display control circuit (not shown) is mounted is provided in the base 2. The image display control circuit is provided for displaying an image imaged by the imaging camera 28 on the display screen of the LCD monitor 14. A cover 17 is attached to the base 2 so as to cover a part of the base 2 lower than the tilting mechanism 9. The LCD monitor 14 is fixed to a bracket 18 mounted on the second tilting mechanism 9.

Figure 3:
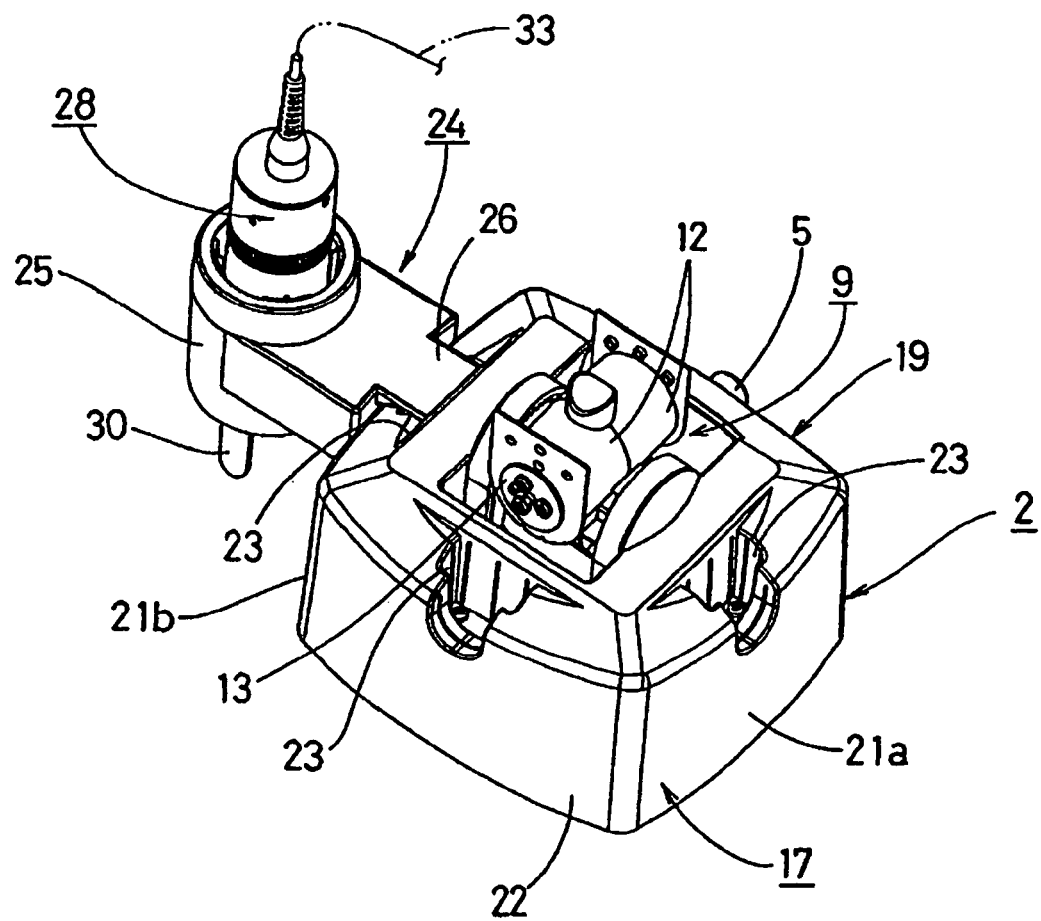
FIG. 3 is a perspective view of the video magnifier with an LCD monitor being eliminated.

The switch 4, the adjusting knob 5 and the connecting terminal 6 provided on the base 2 are viewed through the opening 20 of the front 19 of the base 2. Three mounting grooves 23 each having a generally T-shaped plane are formed in the left and right sides 21a and 21b and the rear 22 respectively, as shown in FIG. 3. A camera holder 24 is attached to each mounting groove 23. Another mounting groove may be formed in the front of the base 2 with the switch 4 having been moved to another place.

The camera holder 24 includes a cylindrical holding section 25 and a mounting arm 26 protruding perpendicularly from an outer periphery of the holding section. The mounting arm 26 has a distal end which is formed generally into a T-shape so as to be detachably attached to the mounting groove 23 in a relation of male and female engagement, whereby the camera holder 24 is detachably attached to the mounting groove 23. The cylindrical holding section 25 has an inner circumferential wall formed with four radial flat wall faces 27.

An imaging camera 28 is held on the cylindrical holding section 25. The imaging camera 28 comprises an image sensor including a downwardly directed imaging lens (not shown), a cylindrical casing 29 and a plurality of support legs 30 mounted on the bottom of the casing. A ring 32 is fitted with an outer circumference of the cylindrical casing 29. The ring 32 has four flat faces 31 engaging the four flat wall faces 27 of the holding section 25 respectively. When the flat wall faces 27 are engaged with the flat faces 31 respectively, the imaging camera 28 can be positioned easily and reliably every 90 degrees. Consequently, when a holding position of the imaging camera 28 has been changed, an inverted or lateral image can be prevented from being displayed on the display screen 15. A cord 33 extends from the top of the casing 29 and is connected to the base 2. The middle portion of the cord 33 is eliminated in the figures.

Figure 4:
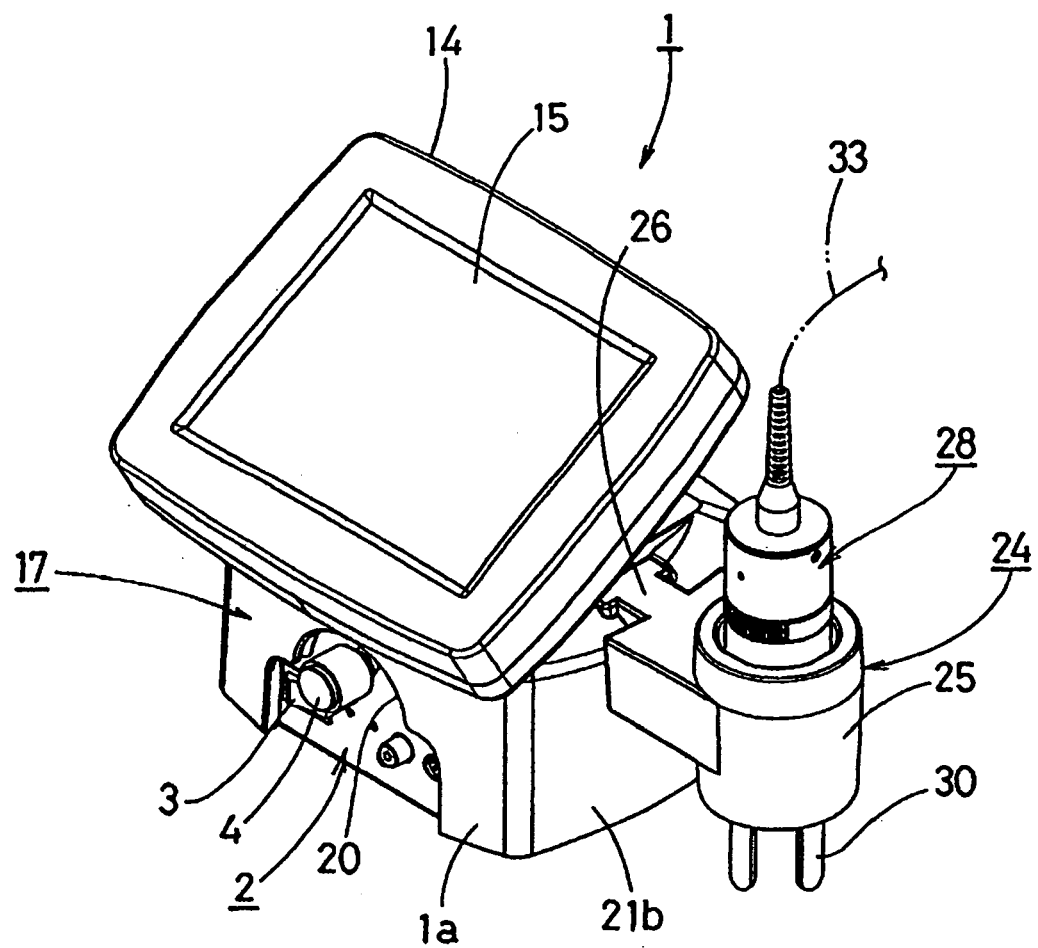
FIG. 4 is a perspective view of the video magnifier in a laterally writing mode.

For a laterally written document, the LCD monitor 14 in a laterally longwise position is tilted by the tilting mechanism 9 so that the front thereof is inclined lower, whereby the visibility of the display screen can be improved. The mounting arm 26 of the camera holder 24 holding the imaging camera 28 is fitted into either one of the mounting grooves 23 formed in the left and right sides 21a and 21b of the base 2, as shown in FIG. 4. At this time, the imaging camera 28 thus held is supported by support legs 30 so as to be located at a predetermined height from a face to be imaged. The generally T-shaped mounting arm 26 is detachably fitted into the generally T-shaped mounting groove 23 in a relation of male and female engagement. Consequently, the camera holder 24 can easily be attached to and detached from the mounting groove 23.

The base 2 is moved left and right so that the laterally written sentence is scanned, and enlarged characters displayed on the display screen 15 of the LCD monitor 14 are read. Since both LCD monitor 14 and imaging camera 15 are moved together with the base 2, the operator's eyes can be concentrated onto the display screen 15 of the LCD monitor 14. Consequently, the easiness in operating the video magnifier can be improved. In this case, the base 2 is smoothly moved left and right by the rollers 7 mounted on the corners of the bottom thereof and prevented from the movement in the oblique directions.

Figure 5A:
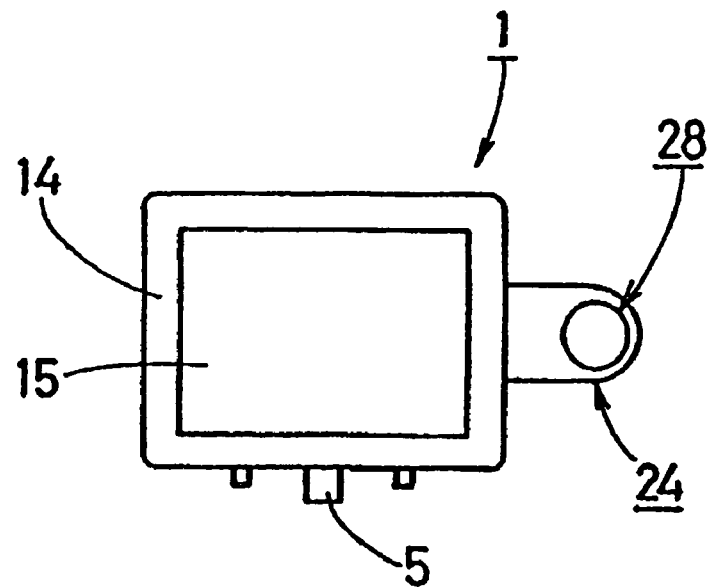
FIGS. 5A and 5B are front views of the LCD monitor, explaining the case where characters or the like are written into a laterally written document.
Figure 5B:
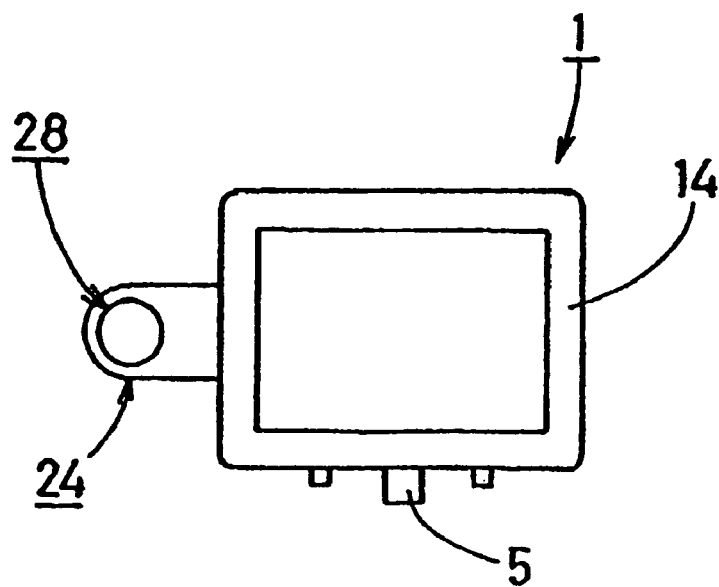

In entry into a laterally written document, the distal end of a writing implement (not shown) is inserted through a space between the support legs 30. Then, the operator can make an entry into the laterally written document while viewing the display screen 15 of the LCD monitor 14. When the operator is right-handed, the mounting arm 26 of the camera holder 24 is fitted into the right mounting groove 23 of the base 2 so that the imaging camera 28 is held, as shown in FIG. 5A. On the other hand, when the operator is left-handed, the imaging camera 28 is held on the left side of the base 2 as shown in FIG. 5B. Consequently, the easiness in the entry into the laterally written document can be improved.

Figure 6:
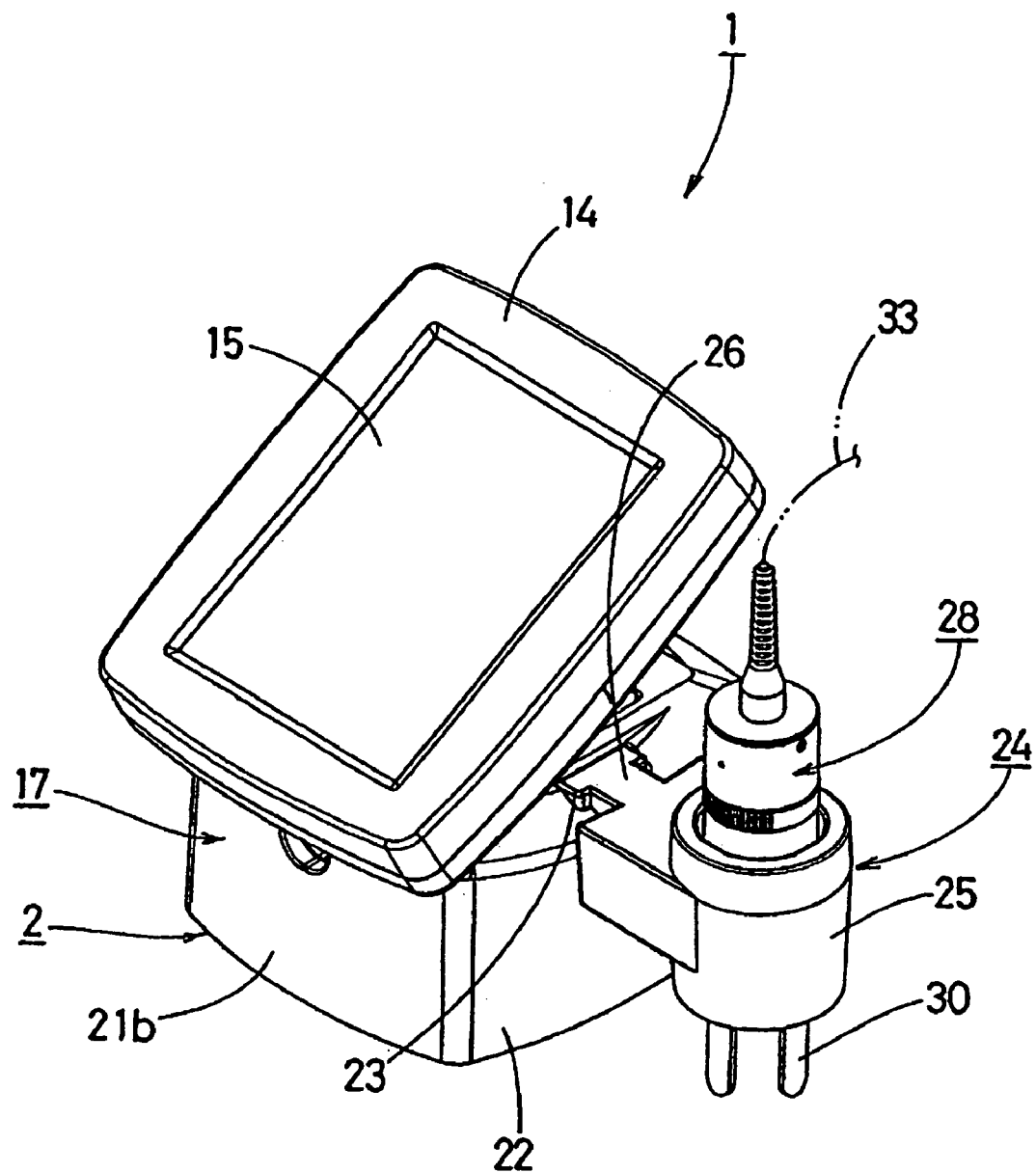
FIG. 6 is a perspective view of the video magnifier in a vertically writing mode.

In the case of a vertically written document, the base 2 is turned 90 degrees rightward or leftward so that the LCD monitor 14 is switched to a vertically long position. Then, the base 2 is inclined by the tilting mechanism 9 so that the front side of the base is lower, whereupon the visibility of the display screen 15 can be increased. The mounting arm 26 of the camera holder 24 holding the imaging camera 28 is fitted into the mounting groove 23 directed to the right or left of the base 2, as shown in FIG. 6. The imaging camera 28 thus held on the camera holder 24 is supported by the support legs 30 so as to be located at a predetermined height from the face to be imaged. When the LCD monitor 14 is turned into the vertically long position, the rollers 7 which have been directed left and right is directed back and forth.

The base 2 is moved back and forth so that the vertically written sentence is scanned, and enlarged characters displayed on the display screen 15 of the LCD monitor 14 are read. In this case, too, both LCD monitor 14 and imaging camera 15 are moved together with the base 2, the operator's eyes can be concentrated onto the display screen 15 of the LCD monitor 14. Consequently, the easiness in operating the video magnifier can be improved. In this case, the base 2 is smoothly moved back and forth since the rollers 7 mounted on the corners of the bottom thereof are directed back and forth, and the base 2 can be prevented from the movement in the oblique directions.

Figure 7A:
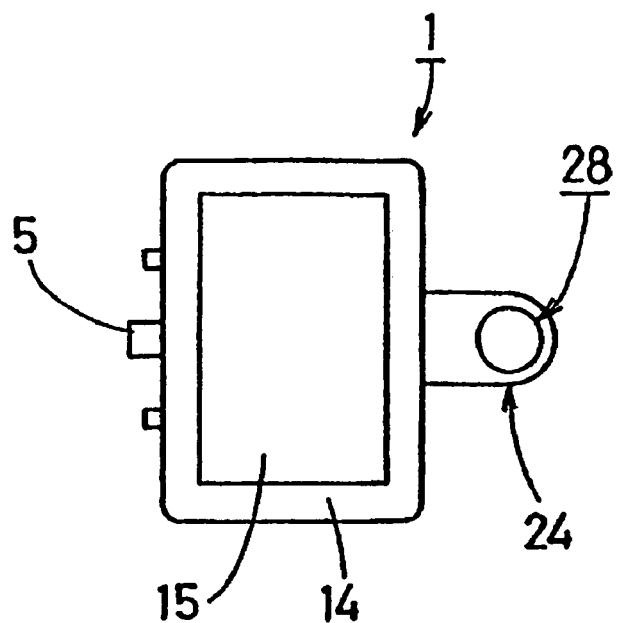
FIGS. 7A and 7B are front views of the LCD monitor, explaining the case where characters or the like are written into a vertically written document.
Figure 7B:
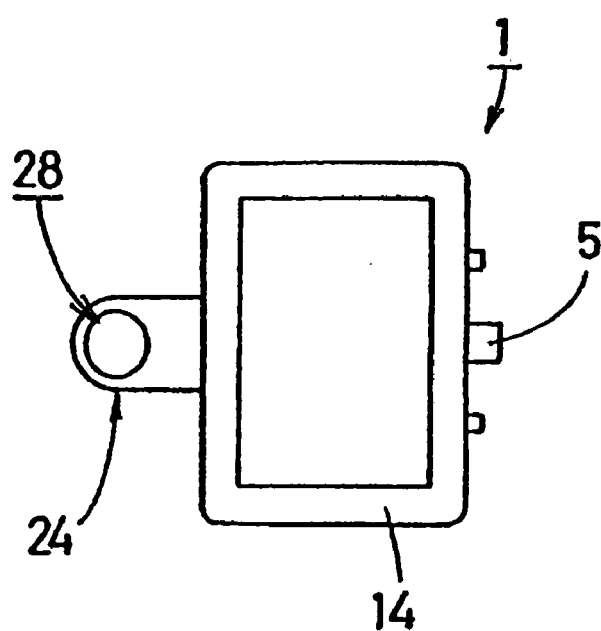

In entry into a vertically written document, the distal end of a writing implement (not shown) is inserted through a space between the support legs 30. Then, the operator can make an entry into the laterally written document while viewing the display screen 15 of the LCD monitor 14. When the operator is right-handed, the base 2 is turned so that the imaging camera 28 is located on the right of the LCD monitor 14 as shown in FIG. 7A. On the other hand, when the operator is left-handed, the base 2 is turned so that the imaging camera 28 is located on the left of the LCD monitor as shown in FIG. 7B. Consequently, the easiness in the entry into the vertically written document can also be improved.

The tilting mechanism 9 includes the first tilting shaft 11 and the second tilting shaft 13 rotatably inserted through the support shaft 12 fixed to the first tilting shaft so as to be perpendicular to the first tilting shaft. Consequently, the construction of the tilting mechanism can be compacted. Additionally, the imaging camera 28 is held on one side of the base 2 and supported by the support legs 30 so as to be located at the predetermined height from the face to be imaged. Consequently, the imaging camera 28 can follow a curved portion caused near the central part of paper in the case where a book with a large number of pages is opened. Thus, even characters on an end of each page can be scanned reliably.

A universal joint mechanism may be used instead of the above-described tilting mechanism.

The foregoing description and drawings are merely illustrative of the principles of the present invention and are not to be construed in a limiting sense. Various changes and modifications will become apparent to those of ordinary skill in the art. All such changes and modifications are seen to fall within the scope of the invention defined by the appended claims.

We claim:

1. A video magnifier comprising:
   a monitor having a rectangular display screen;
   a base having a top on which the monitor is mounted, the base further having a right side, a left side, a front and a rear;
   a plurality of mounting sections provided on the right and left sides and at least one of the front and the rear of the base respectively;
   a camera holder detachably attached to one of the mounting sections;
   an imaging camera held on the holder so as to be detachable from the holder and having a supporting leg supporting the camera within the camera holder at a predetermined height from a face to be imaged; and
   an image display control circuit provided in the base for controlling the monitor so that an image imaged by the imaging camera is displayed on the display screen of the monitor.

2. A video magnifier according to claim 1, wherein the mounting section includes a generally T-shaped mounting groove and the camera holder includes a cylindrical holding section and a generally T-shaped mounting arm protruding perpendicularly from an outer periphery of the holding section, the mounting arm being detachably fitted into the mounting groove in a relation of male and female engagement, whereby the camera holder is detachably attached to the mounting section.

3. A video magnifier according to claim 2, further comprising a roller provided on the bottom of the base so as to be moved either left and right or forward and rearward.

4. A video magnifier according to claim 2, further comprising a tilting mechanism provided on the top of the base so that the monitor is inclined forward, rearward, left and right.

5. A video magnifier according to claim 4, further comprising a roller provided on the bottom of the base so as to be moved either left and right or forward and rearward.

6. A video magnifier according to claim 4, wherein the tilting mechanism includes a first tilting shaft pivotally mounted on a pair of shaft support brackets and a second tilting shaft rotatably inserted through a support shaft fixed to the first tilting shaft so as to be perpendicular to the first tilting shaft.

7. A video magnifier according to claim 6, further comprising a roller provided on the bottom of the base so as to be moved either left and right or forward and rearward.

8. A video magnifier according to claim 1, wherein the imaging camera includes a cylindrical casing for accommodating the camera and a ring fitted with an outer circumference of the casing and having four flat faces, and the cylindrical holding section of the camera holder has an inner circumferential wall formed with four flat wall faces, the flat wall faces and the flat faces being engaged with each other respectively when the imaging camera is inserted into the cylindrical holding section to be held, whereby the imaging camera is prevented from turn and positioned.

9. A video magnifier according to claim 8, further comprising a roller provided on the bottom of the base so as to be moved either left and right or forward and rearward.

10. A video magnifier according to claim 8, further comprising a tilting mechanism provided on the top of the base so that the monitor is inclined forward, rearward, left and right.

11. A video magnifier according to claim 10, further comprising a roller provided on the bottom of the base so as to be moved either left and right or forward and rearward.

12. A video magnifier according to claim 10, wherein the tilting mechanism includes a first tilting shaft pivotally mounted on a pair of shaft support brackets and a second tilting shaft rotatably inserted through a support shaft fixed to the first tilting shaft so as to be perpendicular to the first tilting shaft.

13. A video magnifier according to claim 12, further comprising a roller provided on the bottom of the base so as to be moved either left and right or forward and rearward.

14. A video magnifier according to claim 1, further comprising a tilting mechanism provided on the top of the base so that the monitor is inclined forward, rearward, left and right.

15. A video magnifier according to claim 14, further comprising a roller provided on the bottom of the base so as to be moved either left and right or forward and rearward.

16. A video magnifier according to claim 14, wherein the tilting mechanism includes a first tilting shaft pivotally mounted on a pair of shaft support brackets and a second tilting shaft rotatably inserted through a support shaft fixed to the first tilting shaft so as to be perpendicular to the first tilting shaft.

17. A video magnifier according to claim 16, further comprising a roller provided on the bottom of the base so as to be moved either left and right or forward and rearward.

18. A video magnifier according to claim 1, further comprising a roller provided on the bottom of the base so as to be moved either left and right or forward and rearward.

* * * * *